M. GREENSFELDER.
COMBINED GLOVE-STRETCHER AND HAND-MEASURE.
No. 181,671.  Patented Aug. 29, 1876.
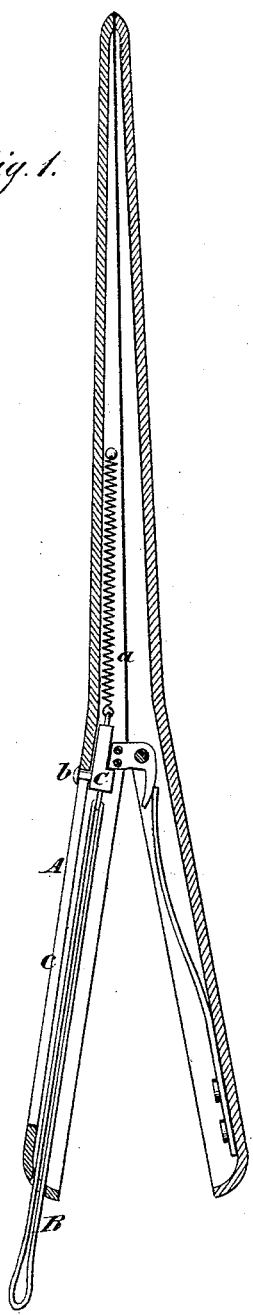

UNITED STATES PATENT OFFICE.

MOSES GREENSFELDER, OF HARRISBURG, PENNSYLVANIA.

IMPROVEMENT IN COMBINED GLOVE-STRETCHER AND HAND-MEASURE.

Specification forming part of Letters Patent No. 181,671, dated August 29, 1876; application filed June 12, 1876.

*To all whom it may concern:*

Be it known that I, MOSES GREENSFELDER, of Harrisburg, Dauphin county, Pennsylvania, have invented a new and Improved Combined Glove-Stretcher and Hand-Measure, of which the following is a specification:

Figure 1 is a longitudinal section, and Fig. 2 is a side elevation.

Similar letters of reference indicate corresponding parts.

My invention consists in the combination of a hand-measure with a glove-stretcher, the measure being so arranged within the handle of the stretcher as to be capable of being drawn out for use, and is caused to regain its position in the handle by means of a suitable spring.

A is the jaw of an ordinary glove-stretcher, which is chambered out to receive the measure B and spring $a$. C is a guide, which is attached to the free end of the spring $a$, and also to the inner end of the measure B.

An index, $b$, is attached to the guide C, and slides in a slot, $c$, in the handle of the stretcher. A scale, $d$, representing the different sizes of gloves, is laid off on each side of the slot $c$.

The measure B is a loop of leather or other pliable material, which is attached to the guide-piece C, and runs through a slit in the end of the stretcher-handle.

The loop or measure B is drawn out and placed around the widest part of the hand, when the index will stand at the number on the scale representing the size required.

This stretcher can be made from any suitable material, such as wood, horn, rubber, ivory, or metal, and the scale may, if desired, be placed on the loop or measure instead of on the handle, as described.

Having thus described my invention, I claim as new and desire to secure by Letters Patent—

1. The combination of a glove-stretcher and hand-measuring device, substantially as shown and described.

2. The combination of the jaw A, loop or measure B, spring $a$, index $b$, and scale $d$, substantially as shown and described.

MOSES GREENSFELDER.

Witnesses:
　　DANL. MCCARROLL,
　　WM. FISHINGER.